US009666020B2

(12) United States Patent

Gobe et al.

(10) Patent No.: US 9,666,020 B2

(45) **Date of Patent: *May 30, 2017**

(54) WAGERING GAME WITH A SECONDARY REEL HAVING OVERSIZED SINGLE-EVALUATION SYMBOLS

(71) Applicant: Bally Gaming, Inc., Las Vegas, NV (US)

(72) Inventors: Alexander J. Gobe, Chicago, IL (US); Jeremy M. Hornik, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/341,804

(22) Filed: Nov. 2, 2016

(65) Prior Publication Data

US 2017/0053481 A1 Feb. 23, 2017

Related U.S. Application Data

(63) Continuation of application No. 13/764,983, filed on Feb. 12, 2013, now Pat. No. 9,520,022.

(Continued)

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ........ *G07F 17/3213* (2013.01); *G07F 17/323* (2013.01); *G07F 17/3209* (2013.01); *G07F 17/3244* (2013.01); *G07F 17/34* (2013.01)

(58) Field of Classification Search

CPC ............................ G07F 17/323; G07F 17/3213

See application file for complete search history.

(56) References Cited

U.S. PATENT DOCUMENTS

| | | | |
|---|---|---|---|
| 5,833,537 | A | 11/1998 | Barrie |
| 6,056,642 | A | 5/2000 | Bennett |

(Continued)

FOREIGN PATENT DOCUMENTS

| | | | |
|---|---|---|---|
| GB | 2092797 | A | 8/1982 |
| GB | 2096376 | A | 10/1982 |

(Continued)

*Primary Examiner* — Dmitry Suhol

*Assistant Examiner* — Carl V Larsen

(74) *Attorney, Agent, or Firm* — Nixon Peabody LLP

(57) ABSTRACT

A gaming system includes one or more input devices, one or more display devices, and one or more processors, and one or more memory devices storing instructions that cause the gaming system to receive an input indicative of a wager. The instructions further cause the gaming system to display a wagering game having an array of symbol positions positioned on a plurality of primary reels and at least one secondary reel overlaying two or more adjacent primary reels, the secondary reel including at least one oversized standard symbol, the oversized symbol overlaying symbol positions on at least two of the two or more adjacent primary reels. The instructions further cause the gaming system to spin the two or more adjacent primary reels and the secondary reel such that the two or more adjacent primary reels and the secondary reel appear to spin as a single reel.

23 Claims, 9 Drawing Sheets

Related U.S. Application Data

(60) Provisional application No. 61/706,303, filed on Sep. 27, 2012.

(56) References Cited

U.S. PATENT DOCUMENTS 6,089,977 A 7/2000 Bennett
6,251,013 B1 6/2001 Bennett
6,270,411 B1 8/2001 Gura et al.
6,517,433 B2 * 2/2003 Loose ................. G07F 17/3202 273/138.1
6,565,433 B1 5/2003 Baerlocher et al.
6,612,927 B1 9/2003 Slomiany et al.
6,731,313 B1 5/2004 Kaminkow
6,837,790 B1 1/2005 Kaminkow
6,918,832 B2 7/2005 Baerlocher et al.
6,981,635 B1 1/2006 Hughs-Baird et al.
8,585,499 B2 * 11/2013 Muir ................... G07F 17/3211 273/143 R
2003/0027626 A1 2/2003 Marks et al.
2003/0186737 A1 10/2003 Bennett et al.
2003/0236115 A1 12/2003 Chamberlain
2004/0097280 A1 5/2004 Gauselmann
2004/0229679 A1 11/2004 Anderson et al.
2005/0049030 A1 3/2005 Tachikawa
2005/0282607 A1 12/2005 Gauselmann
2006/0058097 A1 * 3/2006 Berman .............. G07F 17/3244 463/20
2006/0084497 A1 * 4/2006 Marks ..................... G07F 17/32 463/20
2006/0287060 A1 12/2006 Yoshimi
2008/0045322 A1 2/2008 Berman
2008/0108411 A1 * 5/2008 Jensen .................... G07F 17/32 463/20
2008/0146319 A1 6/2008 Yoshizawa
2008/0287178 A1 * 11/2008 Berman .............. G07F 17/3211 463/20
2009/0131145 A1 * 5/2009 Aoki ................... G07F 17/3211 463/20
2009/0221352 A1 9/2009 Nakano
2009/0227345 A1 9/2009 Yoshizawa
2009/0270165 A1 * 10/2009 Dias Pires .............. G07F 17/32 463/20
2010/0029368 A1 * 2/2010 Hornik .................... G07F 17/34 463/20
2011/0201406 A1 * 8/2011 Jaffe ....................... G07F 17/32 463/21
2011/0223985 A1 * 9/2011 Mizue ..................... G07F 17/34 463/20
2012/0088567 A1 4/2012 Aoki
2013/0184050 A1 * 7/2013 Zoble .................. G07F 17/3213 463/20
2014/0274288 A1 * 9/2014 Hornik .................. G07F 17/326 463/20

FOREIGN PATENT DOCUMENTS

GB 2097160 A 10/1982
GB 2119991 A 11/1983
GB 2137392 A 10/1984
WO WO 03083795 10/2003
ZA 200300725 10/2004

* cited by examiner

WAGERING GAME WITH A SECONDARY REEL HAVING OVERSIZED SINGLE-EVALUATION SYMBOLS

CROSS-REFERENCE TO RELATED APPLICATION

This application is a continuation application of U.S. application Ser. No. 13/764,983 filed Feb. 12, 2013, and claims priority to U.S. Provisional Application No. 61/706,303 filed Sep. 27, 2012, the contents of which are incorporated entirely herein by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a wagering game with a secondary reel having an oversized, single-evaluation symbol thereon.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to one aspect of the present invention, a gaming system comprises one or more input devices, one or more display devices, and one or more processors. The gaming system further comprises one or more memory devices storing instructions that, when executed by the one or more processors, cause the gaming system to receive, via at least one of the one or more input devices, an input indicative of a wager. The instructions further cause the gaming system to display a wagering game having an array of symbol positions positioned on a plurality of primary reels and at least one secondary reel overlaying two or more adjacent primary reels, the secondary reel including at least one oversized symbol, the oversized symbol overlaying symbol positions on at least two of the two or more adjacent primary reels, the oversized symbol being a standard symbol. The instructions further cause the gaming system to spin the two or more adjacent primary reels and the secondary reel such that the two or more adjacent primary reels and the secondary reel appear to spin as a single reel.

According to another aspect of the invention, a computer-implemented method in a gaming system comprises receiving, via at least one of one or more input devices, an input indicative of a wager. The method further comprises displaying, on at least one of one or more display devices, a wagering game having an array of symbol positions positioned on a plurality of primary reels and at least one secondary reel overlaying two or more adjacent primary reels, the secondary reel including at least one oversized symbol, the oversized symbol overlaying symbol positions on at least two of the two or more adjacent primary reels, the oversized symbol being a standard symbol. The method further comprises spinning the two or more adjacent primary reels and the secondary reel, by at least one of one or more processors, such that the two or more adjacent primary reels and the secondary reel appear to spin as a single reel.

According to another aspect of the invention, one or more physical machine-readable storage media includes instructions which, when executed by one or more processors, cause the one or more processors to perform operations comprising receiving, via at least one of the one or more input devices, an input indicative of a wager. The instructions further cause the one or more processors to display on one or more display devices a wagering game having an array of symbol positions positioned on a plurality of primary reels and at least one secondary reel overlaying two or more adjacent primary reels, the secondary reel including at least one oversized symbol, the oversized symbol overlaying symbol positions on at least two of the two or more adjacent primary reels, the oversized symbol being a standard symbol. The instructions further cause the one or more processors to spin the two or more adjacent primary reels and the secondary reel such that the two or more adjacent primary reels and the secondary reel appear to spin as a single reel.

According to another aspect of the invention, a gaming system comprises one or more input devices, one or more display devices, and one or more processors. The gaming system further comprises one or more memory devices storing instructions that, when executed by the one or more processors, cause the gaming system to receive, via at least one of the one or more input devices, an input indicative of a wager. The instructions further cause the gaming system to display a wagering game having a plurality of primary reels, each of the primary reels having a plurality of symbols thereon and determine a width of a secondary reel having at least one oversized symbol thereon, the width corresponding to a width of from two primary reels to all of the primary reels. The instructions further cause the gaming system to overlay two or more adjacent primary reels with the secondary reel having the determined width and spin the two or more adjacent primary reels overlaid by the secondary reel such that the two or more adjacent primary reels overlaid by the secondary reel appear to spin as a single reel. The oversized symbol extends across at least two of the two or more adjacent primary reels.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
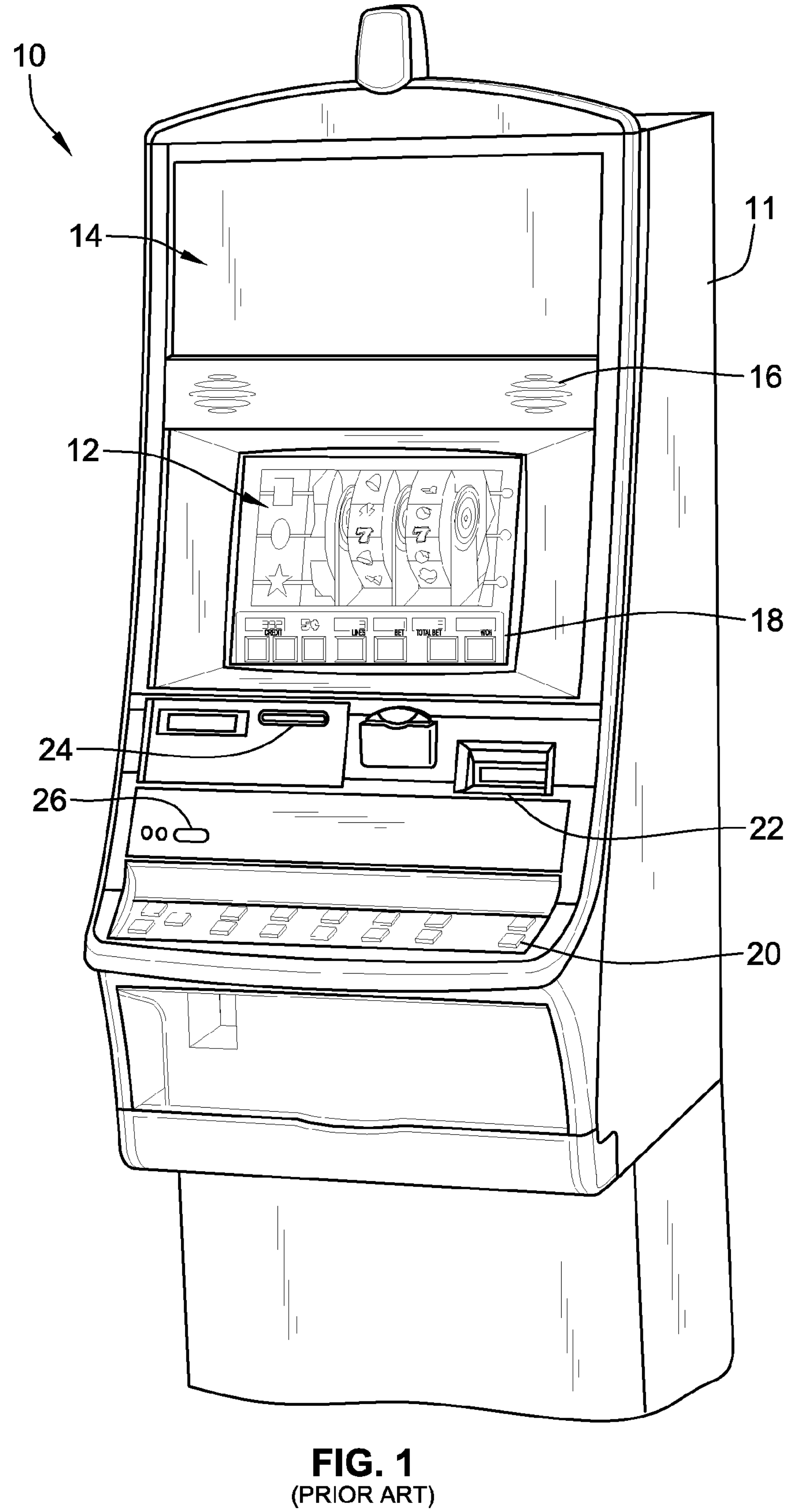
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
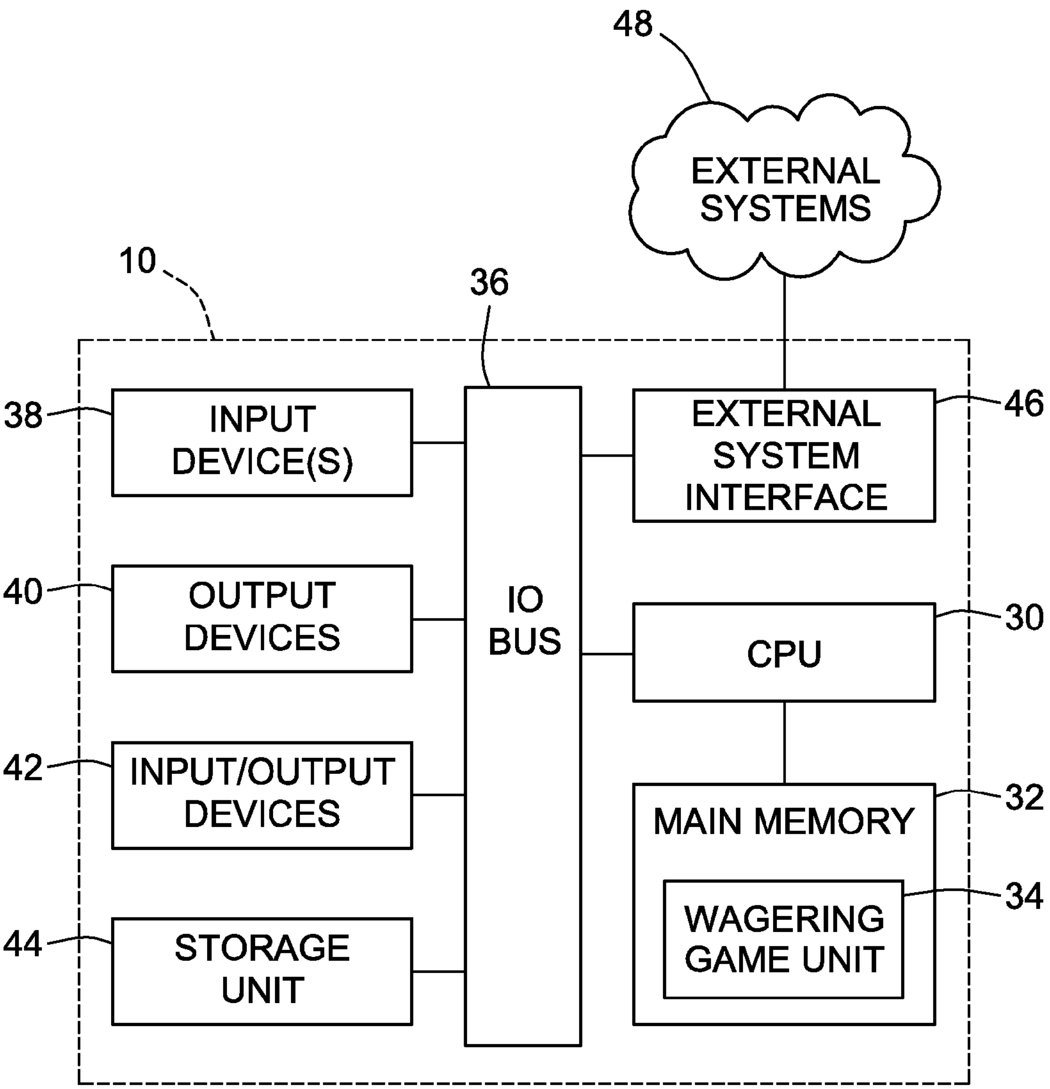
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video blackjack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
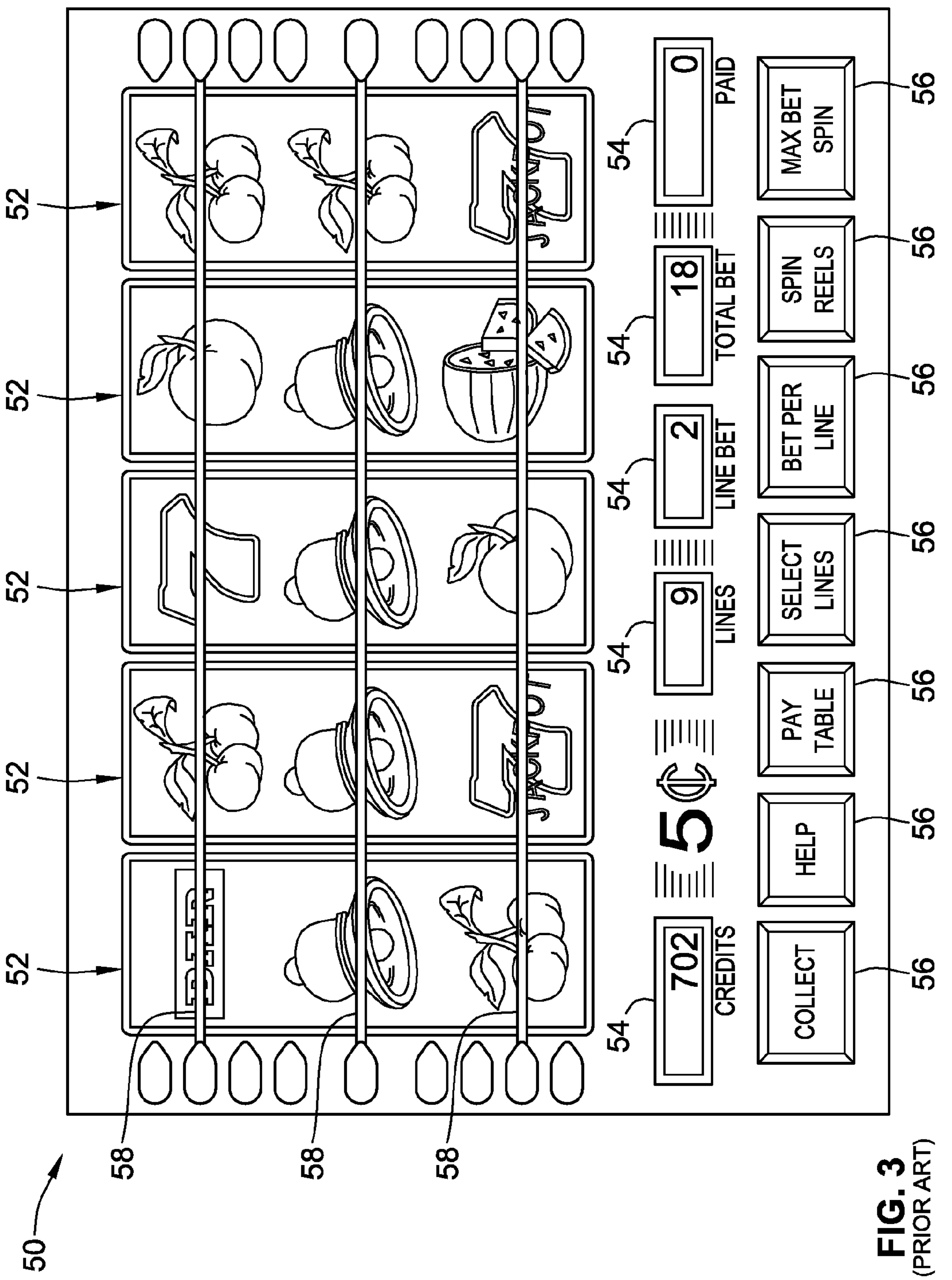
FIG. 3 (PRIOR ART)
FIG. 3 is an image of an exemplary basic-game screen of a wagering game displayed on a gaming terminal.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
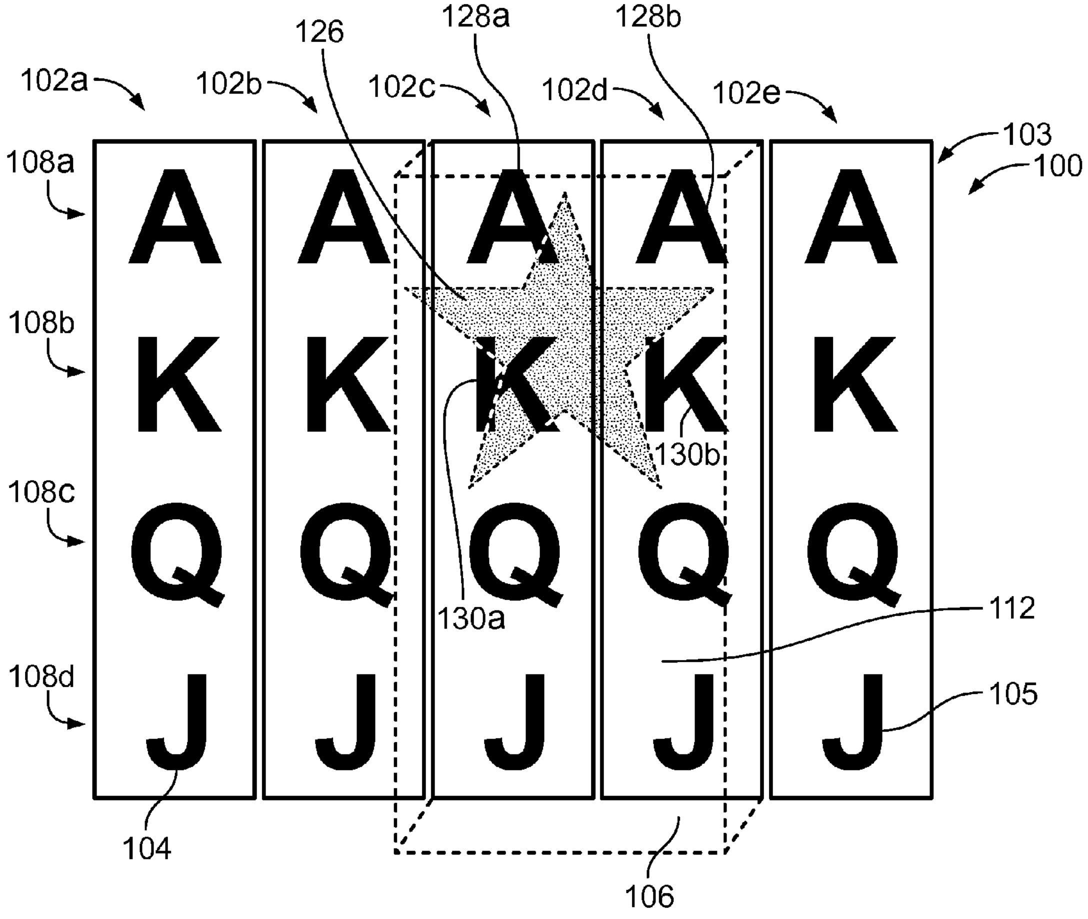
FIG. 4 is an image of a game screen of a wagering game displayed on a gaming terminal, according to an embodiment of the present invention.

Referring now to FIG. 4, is an image of a game screen 100 of a wagering game displayed on a gaming terminal 10, according to one embodiment, is illustrated. The game screen 100 may be displayed on the primary display 12 or the secondary display 14 during a wagering game or a bonus feature. The game screen 100 portrays a plurality of primary reels 102*a*-102*e* forming an array of symbols 103. Each symbol 104 of the array 103 is positioned in a respective symbol position 105. The primary reels 102*a*-102*e* may include mechanical reels or other video or mechanical presentations. Although in the illustrated embodiments, the plurality of symbols 105 includes symbols corresponding with a royal flush/deck of cards (e.g., "A," "K," "Q," "J", and "10"), it is contemplated that any suitable types of symbols may be used.

The game screen 100 of FIG. 4 also includes a secondary reel 106 that overlays two or more adjacent primary reels 102*a*-102*e*. In the illustrated embodiment, the secondary reel 106 overlays two primary reels—the third primary reel 102*c* and the fourth primary reel 102*d*. The secondary reel 106 and the primary reels 102*c*-102*d* that it overlays may form what appears to be a "combined" reel 107 (see FIG. 5), which, in some embodiments, appear to spin together, as discussed in more detail below.

Figure 5:
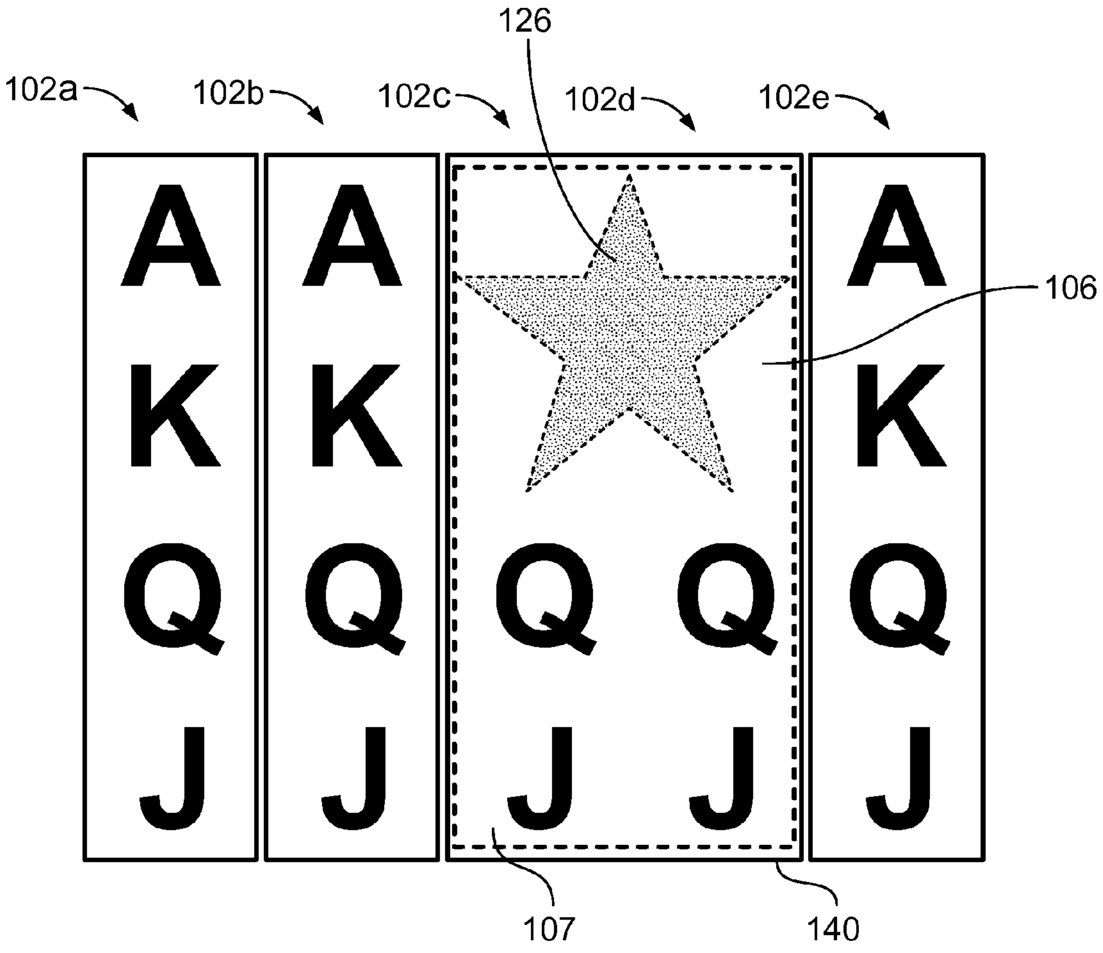
FIG. 5 is an image of a game screen subsequent to the game screen of FIG. 4.

The secondary reel of the embodiments described herein may overlay any adjacent primary reels. In other words, the position of the secondary reel 106 on the array of symbols 103 may vary. As shown in FIGS. 4-5, the secondary reel 106 overlays the third and fourth primary reels 102*c*, 102*d*. In another embodiment shown in FIGS. 6*a*-6*c*, a secondary reel 116 overlays the first and second primary reels 118*a*, 118*b*.

The secondary reel of the embodiments described herein may also overlay any amount of adjacent primary reels. In other words, the width of the secondary reel may vary such that the secondary reel may overlay anywhere from two adjacent primary reels to all of the primary reels. In the embodiments of FIGS. 4-6, the secondary reels 106, 116 overlay two adjacent primary reels (i.e., the secondary reels 106, 116 are each two reels wide). In the embodiment of FIG. 7, on the other hand, a secondary reel 122 overlays all of the primary reels (i.e., the secondary reel 116 is five reels wide).

The position (i.e., which reels are overlaid) and the width (i.e., how many reels are overlaid) of the secondary reel may be determined in any suitable way. For example, the position and width of the secondary reel may vary from spin to spin, may be randomly determined, and/or may be determined by a predetermined condition (e.g., a particular symbol or type of symbol being achieved in the array of symbols).

It is also contemplated that more than one secondary reel may be used to overlay more than one group of adjacent primary reels. For example, a first secondary reel may overlay the first and second primary reels, and a second secondary reel may overlay the fourth and fifth primary reels.

The secondary reel(s) of the embodiments described herein includes blank areas, blank symbols, or blank symbol positions and one or more oversized standard symbols. The oversized symbol(s) occupies or overlays symbol positions on at least two of the two or more adjacent primary reels overlaid by the secondary reel. The secondary reel may optionally further include other symbols (e.g., symbols that overlay a single symbol position, more than one symbol position of the same column/reel, etc.). In the illustrated embodiment of FIGS. 4-5, the secondary reel 106 includes an oversized star symbol 126 that overlays the symbol positions of first and second rows 108*a*-108*b* and blank symbols/a blank area 112 that overlays the symbol positions of third and fourth rows 108*c*-108*d*.

In embodiments where the secondary reel extends across or overlays more than two primary reels, the oversized symbol may extend across less than all of the overlaid primary reels. For example, if the secondary reel overlays all five primary reels, the oversized symbol may extend across and overlay adjacent symbol positions on any of two, three, four, or five of the primary reels.

The oversized symbols(s) positioned on the secondary reel may overlay any amount of rows in the array of symbols. As shown in FIG. 4, for example, the oversized star symbol 126 overlays a 2×2 matrix of symbols including the symbols in the first and second rows 108*a*-108*b* of the third and fourth columns 102*c*-102*d* (i.e., "A" symbols 128*a*, 128*b* and "K" symbols 130*a*, 130*b*). Although not necessary, in the subsequent screen shown in FIG. 5, the symbols 128*a*, 128*b*, 130*a*, 130*b* overlaid or "covered up" by the oversized star symbol 126 have been removed from the array of symbols 103 such that it is visually clear that those symbols have been replaced by the oversized star symbol 126. In other words, a portion of the oversized star symbol 126 replaces each of the symbols 128*a*, 128*b*, 130*a*, 130*b* overlaid by the oversized star symbol 126.

Figure 6A:
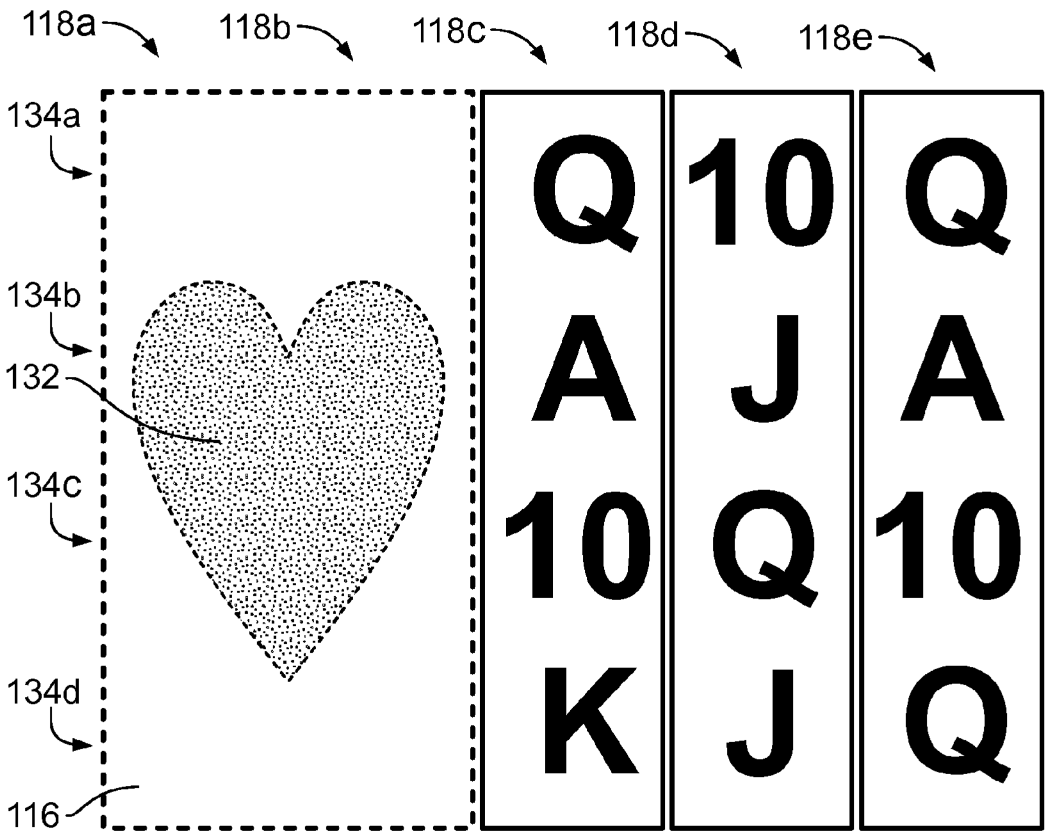
FIGS. 6A-6C are images of game screens of a wagering game displayed on a gaming terminal, according to another embodiment of the present invention.
Figure 6B:
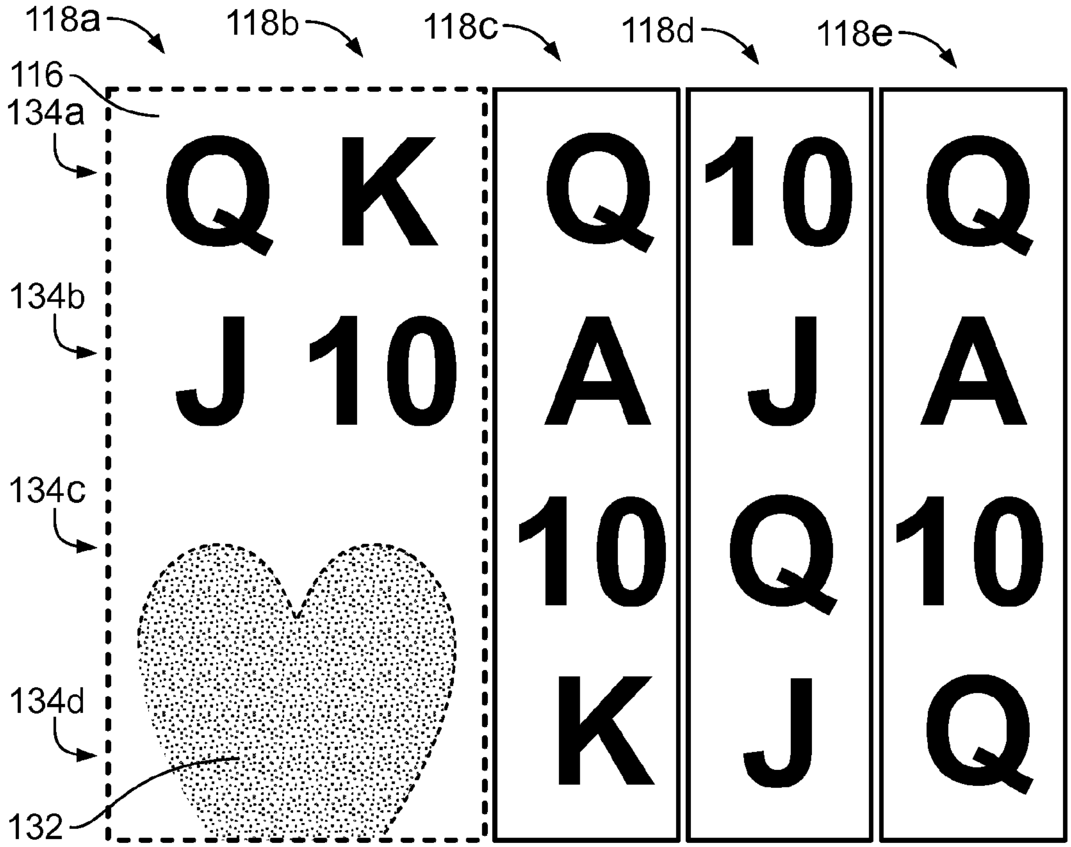
Figure 7:
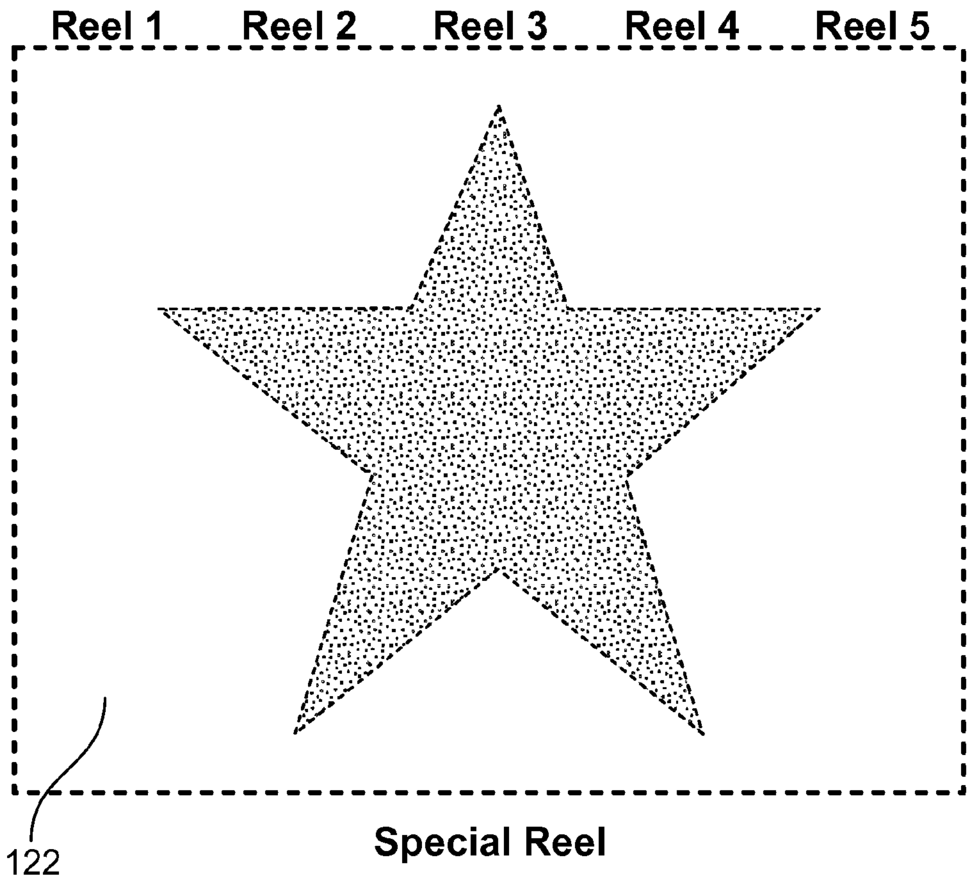
FIG. 7 is an image of a game screen of a wagering game displayed on a gaming terminal, according to another embodiment of the present invention.

As shown in FIG. 6A, an oversized heart symbol 132 of the secondary reel 116 is displayed in a first stop position in which the oversized heart symbol 132 overlays the symbols of all of the rows 134*a*-134*d* of the first and second reels 118*a*-118*b*. FIG. 6B illustrates another possible stop position/outcome in which, when the secondary reel 116 has finished spinning, only half of the oversized heart symbol 132 is displayed. In this embodiment, the oversized heart symbol 132 only overlays the symbols of the third and fourth rows 134*c*-134*d* of the first and second reels 118*a*-118*b*.

Figure 6C:
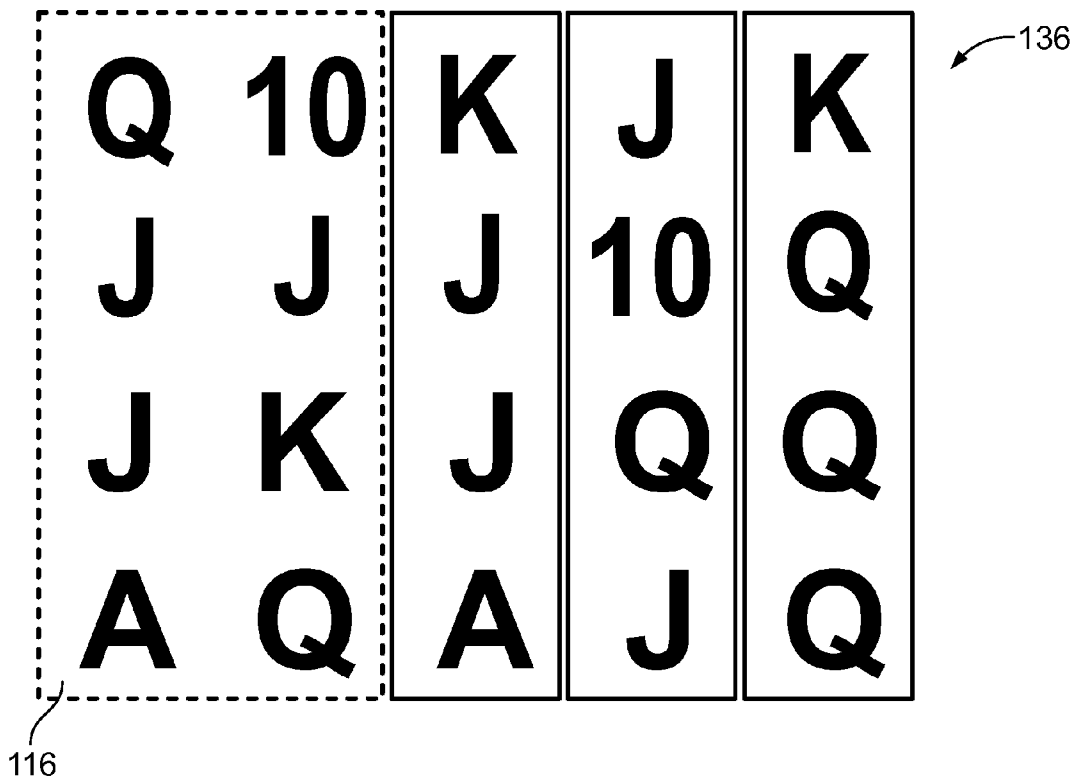

FIG. 6C shows an array of symbols 136 in which the stop position of the secondary reel 116 was such that none of the oversized heart symbol 132 was displayed as a part of the outcome. Thus, only the blank area of the secondary reel 116 is displayed in the final stop position.

The secondary reel may spin before, simultaneously with, or after the primary reels are spun. Referring back to FIGS. 4-5, in one embodiment, after a final stop position (e.g., a randomly selected outcome) for each of the primary reels 102*a*-102*e* and the secondary reel 106 is determined by the CPU, the primary reels 102*a*-102*e* and the secondary reel 106 are spun. The secondary reel 106 may be visually "grafted" with the third and fourth primary reels 102*c*, 102*d*, which are overlaid by the secondary reel 106. Thus, the secondary reel 106, the third primary reel 102*c*, and the fourth primary reel 102*d* appear to spin together as a single reel (e.g., the combined reel 107). The first primary reel 102*a* may come to a stop, followed by the second primary reel 102*b*. The combined reel 107 may then come to a stop (e.g., the third primary reel 102*c*, the fourth primary reel 102*d*, and the secondary reel 106 may all stop simultaneously), followed by the fifth primary reel 102*e*. The resulting array of symbols may then be evaluated for a winning outcome(s).

Although in the embodiment described above, the third primary reel 102*c*, the fourth primary reel 102*d*, and the secondary reel 106 appear to be spinning as a single, combined reel 107, the reels 102*c*, 102*d*, 106 actually spin separately and independently of one another such that any number of outcomes and combinations of symbols may be achieved with respect to the third primary reel 102*c*, the fourth primary reel 102*d*, and the secondary reel 106. Various mechanisms may be used to achieve these various outcome possibilities while maintaining the appearance of a single spinning reel. For example, the speed at which each of the reels 102*c*, 102*d*, 106 spins may be adjusted accordingly so that different symbol combinations may be achieved while still maintaining the combined-reel appearance. In another example, each reel may be spliced at a point exactly ten spaces above the final stop position, so that all three reels stop at the same time.

It is also contemplated that the reels may appear to spin separately from one another, e.g., a combined reel may not be utilized. For instance, in another embodiment, the plurality of reels 102*a*-102*e* is spun prior to spinning the secondary reel 106. The first reel 102*a* may come to a stop, followed by the second reel 102*b*, followed by the third and/or fourth reels 102*c*-102*d* (which may or may not be "grafted" to one another), followed by the fifth reel 102*e*. After evaluating the resulting array of symbols 103 displayed on the plurality of reels 102*a*-102*e* for one or more winning outcomes, the secondary reel 106 may then be spun. It is contemplated that the secondary reel 106 may only be spun if a predetermined condition is achieved (e.g., a trigger symbol is achieved on one or more of the plurality of reels 102*a*-102*e*). After spinning the secondary reel 106, the resulting array of symbols may be evaluated for additional winning outcomes that may be formed using, e.g., the oversized star symbol 126 of the secondary reel 106.

The secondary reel and the primary reels that it overlays may be distinguished from the remaining primary reels using any suitable mechanism including, but not limited to, highlighting, a border/outline, a different color scheme, etc. In FIG. 5, the combined reel 107 is outlined by a distinct border 140 around the third and fourth primary reels 102*c*-102*d* and the overlaying secondary reel 106, thereby making the combined reel 107 visually distinct from the remaining primary reels 102*a*, 102*b*, 102*d*.

The oversized symbols positioned on the secondary reels of the embodiments described herein are standard, single-evaluation symbols. In other words, the oversized symbol is treated as a symbol on the pay table (e.g., not a WILD symbol). Referring back to FIGS. 4 and 5, for example, when determining whether and what type of winning outcome has been achieved, the oversized star symbol 126 is treated like four separate star symbols. In other words, the array 103 is evaluated as if a regular-sized star symbol was positioned in each symbol position 105 overlaid by the oversized star symbol 126. Thus, the oversized symbol is only evaluated once—as the pay table symbol with which it corresponds—and does not substitute for every symbol, like a WILD symbol would.

Figure 8:
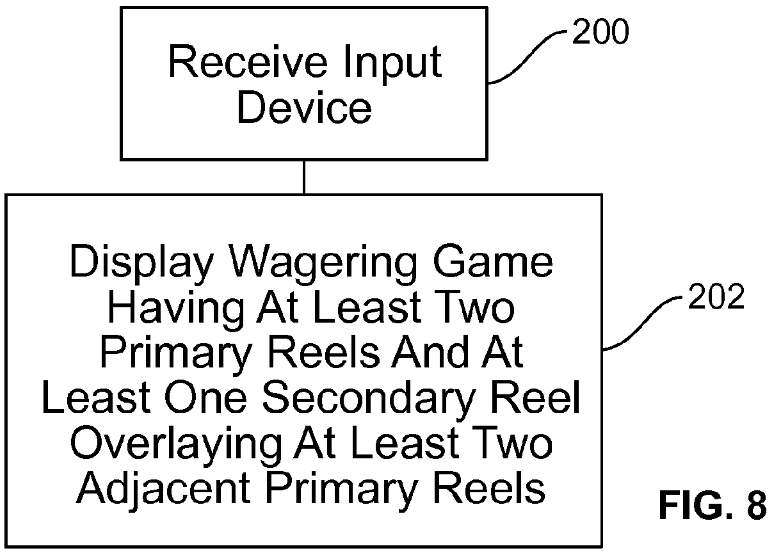
FIG. 8 is a flowchart for an algorithm that corresponds to instructions executed by a controller in accord with at least some aspects of the disclosed concepts.

FIG. 8, described by way of example above, represents one algorithm that corresponds to at least some instructions executed by the CPU 30 in FIG. 2 to perform the above described functions associated with the disclosed concepts. In step 200, a gaming system receives, via at least one of one or more input devices, an input indicative of a wager. At step 202, a wagering game having an array of symbol positions positioned on a plurality of primary reels and at least one secondary reel overlying two or more adjacent primary reels is displayed on at least one display of the gaming system. The secondary reel includes at least one oversized symbol that occupies symbol positions on at least two of the two or more adjacent primary reels. The oversized reel is a standard (pay table) symbol.

Each of these embodiments and obvious variations thereof is contemplated as falling within the spirit and scope of the claimed invention, which is set forth in the following claims. Moreover, the present concepts expressly include any and all combinations and subcombinations of the preceeding elements and aspects.

What is claimed is:

1. A gaming system, comprising:

a gaming machine including an electronic display device and one or more electronic input devices; and one or more controllers configured to:

detect, via at least one of the one or more electronic input devices, a physical item associated with a monetary value that establishes a credit balance, initiate the casino wagering game in response to an input indicative of a wager covered by the credit balance, direct the electronic display device to display a plurality of symbol-bearing primary reels and at least one symbol-bearing secondary reel overlaying at least two adjacent ones of the primary reels, spin, on the electronic display device, the primary reels and the at least one secondary reel such that the overlaid adjacent primary reels and the at least one secondary reel are visually grafted together and appear to spin together as a single reel, stop, on the electronic display device, the primary reels and the at least one secondary reel at independent respective stopping positions that, together, represent an outcome of the casino wagering game, the overlaid adjacent primary reels and the at least one secondary reel being stopped simultaneously, and receive, via at least one of the one or more electronic input devices, a cashout input that initiates a payout from the credit balance.

2. The gaming system of claim 1, wherein the one or more controllers are configured to determine, independent of player selection, at least one of a position or a width of the at least one secondary reel.

3. The gaming system of claim 2, wherein the one or more controllers are configured to randomly determine at least one of the position or the width of the at least one secondary reel.

4. The gaming system of claim 1, wherein the at least one secondary reel includes an oversized symbol overlaying multiple symbol positions on the overlaid adjacent primary reels.

5. The gaming system of claim 4, wherein the at least one secondary reel includes a blank that reveals each of the symbols located in symbol positions overlaid by the blank.

6. The gaming system of claim 4, wherein the overlaid symbol positions include multiple columns and multiple rows.

7. The gaming system of claim 4, wherein the one or more controllers are further configured to evaluate a symbol array populated by the stopped primary and at least one secondary reels for one or more winning outcomes, the oversized symbol being evaluated as multiple standard symbols in the multiple symbol positions overlaid by the oversized symbol.

8. The gaming system of claim 1, wherein the at least one secondary reel overlays the plurality of primary reels.

9. The gaming system of claim 1, wherein the at least one secondary reel includes a plurality of secondary reels, each secondary reel overlaying a respective group of adjacent ones of the primary reels.

10. A method of operating a gaming system, the gaming system including an electronic display device and one or more electronic input devices, the method comprising:

detecting, via at least one of the one or more electronic input devices, a physical item associated with a monetary value that establishes a credit balance;

initiating the casino wagering game in response to an input indicative of a wager covered by the credit balance;

directing the electronic display device to display a plurality of symbol-bearing primary reels and at least one symbol-bearing secondary reel overlaying at least two adjacent ones of the primary reels;

spinning, on the electronic display device, the primary reels and the at least one secondary reel such that the overlaid adjacent primary reels and the at least one secondary reel are visually grafted together and appear to spin together as a single reel;

stopping, on the electronic display device, the primary reels and the at least one secondary reel at independent respective positions that, together, represent an outcome of the casino wagering game, the overlaid adjacent primary reels and the at least one secondary reel being stopped simultaneously; and receiving, via at least one of the one or more electronic input devices, a cashout input that initiates a payout from the credit balance.

11. The method of claim 10, further comprising determining, independent of player selection, at least one of a position or a width of the at least one secondary reel.

12. The method of claim 11, further comprising randomly determining at least one of the position or the width of the at least one secondary reel.

13. The method of claim 10, wherein the at least one secondary reel includes an oversized symbol overlaying multiple symbol positions on the overlaid adjacent primary reels.

14. The method of claim 13, wherein the at least one secondary reel includes a blank that reveals each of the symbols located in symbol positions overlaid by the blank.

15. The method of claim 13, wherein the overlaid symbol positions include multiple columns and multiple rows.

16. The method of claim 13, further comprising evaluating a symbol array populated by the stopped primary and at least one secondary reels for one or more winning outcomes, the oversized symbol being evaluated as multiple standard symbols in the multiple symbol positions overlaid by the oversized symbol.

17. The method of claim 10, wherein the at least one secondary reel overlays the plurality of primary reels.

18. The method of claim 10, wherein the at least one secondary reel includes a plurality of secondary reels, each secondary reel overlaying a respective group of adjacent ones of the primary reels.

19. A casino gaming machine primarily dedicated to playing at least one casino wagering game comprising:

an electronic display device;

one or more electronic input devices; and one or more controllers configured to:

detect, via at least one of the one or more electronic input devices, a physical item associated with a monetary value that establishes a credit balance, initiate the casino wagering game in response to an input indicative of a wager covered by the credit balance, direct the electronic display device to display a plurality of symbol-bearing primary reels and at least one symbol-bearing secondary reel overlaying at least two adjacent ones of the primary reels, spin, on the electronic display device, the primary reels and the at least one secondary reel such that the overlaid adjacent primary reels and the at least one secondary reel are visually grafted together and appear to spin together as a single reel, stop, on the electronic display device, the primary reels and the at least one secondary reel at independent respective stopping positions that, together, represent an outcome of the casino wagering game, the overlaid adjacent primary reels and the at least one secondary reel being stopped simultaneously, and receive, via at least one of the one or more electronic input devices, a cashout input that initiates a payout from the credit balance.

20. The casino gaming machine of claim 19, wherein the one or more controllers are further configured to determine, independent of player selection, at least one of a position or a width of the at least one secondary reel.

21. The casino gaming machine of claim 20, wherein the one or more controllers are configured to randomly determine at least one of the position or the width of the at least one secondary reel.

22. The casino gaming machine of claim 19, wherein the at least one secondary reel includes an oversized symbol overlaying multiple symbol positions on the overlaid adjacent primary reels.

23. The casino gaming machine of claim 19, wherein the at least one secondary reel includes a plurality of secondary reels, each secondary reel overlaying a respective group of adjacent ones of the primary reels.

* * * * *